UNITED STATES PATENT OFFICE.

WILLIAM J. BURNS, OF BRIDGEPORT, CONNECTICUT, ASSIGNOR TO THE PEERLESS VULCANITE COMPANY, OF BRIDGEPORT, CONNECTICUT, A CORPORATION OF CONNECTICUT.

PROCESS OF FORMING ARTICLES FROM PLASTIC MATERIAL.

1,190,510.

Specification of Letters Patent.

Patented July 11, 1916.

No Drawing. Application filed April 18, 1916. Serial No. 92,035.

*To all whom it may concern:*

Be it known that I, WILLIAM J. BURNS, a citizen of the United States, residing at Bridgeport, county of Fairfield, State of Connecticut, have invented an Improvement in Processes of Forming Articles from Plastic Material, of which the following is a specification.

This invention has for its object the production of articles from plastic material, which shall be perfect in form and finish, and may be produced very much more rapidly and economically than has heretofore been possible.

The process now in general use of molding plastic articles is substantially as follows: A mass of the material, rendered plastic by heat, is placed in the mold and is caused to flow or spread over the surface of the mold by the application of the necessary amount of pressure. The results obtained have been more or less unsatisfactory, owing to the various difficulties in carrying out the process. The plastic mass is apt to be either too hard or too soft, and is frequently found to contain foreign substances, and when the molds are subjected to pressure to spread the mass and to polish and finish the articles, the molds are often seriously damaged and sometimes destroyed by the foreign substances.

In carrying out my novel process, I first crush the material into relatively small particles, if preferred, to a powder. The special composition used is immaterial so far as my novel process is concerned, the process being applicable to any of the plastic compositions in general use in the manufacture of molded articles, for example, a composition consisting of gum copal, barytes, terra alba, and lamp black. It is likewise immaterial what special mechanical means are used in carrying out the process. It is sufficient for the purposes of this specification to state that the mold, upon a suitable carrier or holder, is placed under a suitable box or sieve containing the composition and a light coating or layer of the particles of material is deposited upon the mold, being sifted as it is deposited so as to insure that nothing injurious can pass to the mold. The mold with the layer of particles of the material upon it is then passed through an oven and heated sufficiently to expel all the gases and vapor from the material and render it plastic. Another thin coating or layer of the particles of material is then applied in the same manner and the mold passed through an oven and the material rendered plastic and the gases and vapor expelled as before, the alternate application of layers of the material and subjection of the material to sufficient heat to expel the gases and vapor being repeated until the required amount of material is in the mold. The mold is then closed and the material therein is subjected to a heating and pressing operation and then to a cooling operation.

The result of my novel process is the obtainment of articles having true surfaces which are sharper in outline, are of standard weight and are stronger and more durable than when produced by the ordinary process. The heating and spreading of the particles of material upon the mold prior to the application of pressure has the effect of obviating the various inconveniences of the ordinary process and moreover enables me to produce the articles much more expeditiously and with less labor than has heretofore been possible. When made by my novel process the labor of trimming or edging the articles is reduced to the minimum.

Having thus described my invention, I claim:

1. The process of forming articles from plastic material which consists in crushing the material into particles, depositing a layer of the particles upon a mold, subjecting the material to heat sufficient to expel the gases and vapor, depositing one or more additional layers of the crushed material upon the material in the mold, subjecting each additional deposit of the crushed material to heat to expel the gases and vapor, and then subjecting the material to pressure to give it the required form.

2. The process of forming articles from plastic material which consists in crushing the material into particles, depositing the material in layers upon a mold, expelling the gases and vapors from each layer of the material by the application of heat, and then subjecting the material to pressure.

In testimony whereof I affix my signature.

WILLIAM J. BURNS.